United States Patent
Sykora et al.

(10) Patent No.: US 8,121,751 B2
(45) Date of Patent: Feb. 21, 2012

(54) METHOD FOR ASSISTING IN ERROR DETECTION FOR A MOTOR VEHICLE

(75) Inventors: Thomas Sykora, Munich (DE); Anne-Laure Schulze Wessel, Munich (DE); Nizar Hneini, Munich (DE); Tobias Kiefer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1108 days.

(21) Appl. No.: 11/703,794

(22) Filed: Feb. 8, 2007

(65) Prior Publication Data

US 2007/0185630 A1      Aug. 9, 2007

(30) Foreign Application Priority Data

Feb. 9, 2006    (DE) .................. 10 2006 005 942

(51) Int. Cl.
*G06F 19/00*       (2011.01)
*G05D 1/00*        (2006.01)

(52) U.S. Cl. .................. 701/35; 701/1; 701/29; 701/41; 701/43

(58) Field of Classification Search .................. 701/29, 701/35
See application file for complete search history.

(56) References Cited

U.S. PATENT DOCUMENTS

| | | | | |
|---|---|---|---|---|
| 5,212,722 A | * | 5/1993 | Murata | 455/570 |
| 5,659,594 A | * | 8/1997 | Toda | 455/550.1 |
| 6,542,758 B1 | * | 4/2003 | Chennakeshu et al. | 455/569.2 |
| 6,559,773 B1 | * | 5/2003 | Berry | 340/815.4 |
| 6,748,244 B2 | * | 6/2004 | Odinak | 455/569.2 |
| 6,873,889 B2 | * | 3/2005 | Vollmer et al. | 701/36 |
| 7,016,986 B2 | * | 3/2006 | Fasolt | 710/8 |
| 2002/0025832 A1 | * | 2/2002 | Durian et al. | 455/556 |
| 2003/0224840 A1 | * | 12/2003 | Frank et al. | 455/575.9 |
| 2004/0054445 A1 | * | 3/2004 | Vollmer et al. | 701/1 |
| 2007/0185630 A1 | * | 8/2007 | Sykora et al. | 701/35 |

FOREIGN PATENT DOCUMENTS

| | | |
|---|---|---|
| DE | 198 60 454 A1 | 5/2000 |
| DE | 100 22 423 A1 | 11/2001 |
| DE | 100 23 703 A1 | 11/2001 |
| DE | 100 45 303 A1 | 4/2002 |
| DE | 101 34 717 A1 | 2/2003 |
| WO | WO 97/28988 | 8/1997 |
| WO | WO 9728988 A1 * | 8/1997 |
| WO | WO 00/72463 A2 | 11/2000 |

OTHER PUBLICATIONS

Nokia, Wireless Car Kit web page, for XP-002296728, Sep. 16, 2004.
European Search Report for 07001434.5 dated Mar. 14, 2011.

\* cited by examiner

*Primary Examiner* — Khoi Tran
*Assistant Examiner* — Ian Jen
(74) *Attorney, Agent, or Firm* — Crowell & Moring LLP

(57) ABSTRACT

In a method for assisting in error detection for a motor vehicle, characteristic data for an accessory device connected to a device in the motor vehicle are stored in a memory unit provided in the motor vehicle.

20 Claims, 1 Drawing Sheet

METHOD FOR ASSISTING IN ERROR DETECTION FOR A MOTOR VEHICLE

CROSS REFERENCE TO RELATED APPLICATIONS

This application claims priority under 35 U.S.C. §119 to German Patent Application No. 10 2006 005942.5 filed Feb. 9, 2006, the entire disclosure of which is herein expressly incorporated by reference.

BACKGROUND AND SUMMARY OF THE INVENTION

The present invention relates to a method for assisting in error detection for a motor vehicle.

The complexity of information technology in current motor vehicles is also increasingly associated with the risk of malfunctions. It is therefore important to facilitate simple and straightforward error detection and any necessary corrective actions. The complexity of information technology increases, in particular, when accessories are to be connected to the motor vehicle or its components outside the sphere of influence of the vehicle manufacturer. Many different methods and devices are known from the prior art for connecting accessory devices, such as telecommunication devices, to motor vehicles.

A common example is the connection of a mobile telephone to a hands-free device in a motor vehicle. To operate reliably, the mobile telephone must be compatible with the motor vehicle or the device in the motor vehicle to which it is connected. Although vehicle manufacturers generally do their best to explain recommended devices to their customers, unsuitable mobile telephones are frequently connected to the motor vehicle by a user. The failure or unreliability of the interaction between the mobile telephone and motor vehicle in many cases results in complaints by the customer and/or complicated error detection and/or repairs.

An object of the present invention is to provide a simple method for simplifying the analysis of errors in the connection of an accessory device to a device in the motor vehicle.

This and other objects and advantages are achieved by a method according to the present invention.

The invention is explained below for the case of an accessory device, designed as a mobile telephone, connected to the motor vehicle. However, the concept of the invention also includes the connection of other accessory devices (for example, smart phones, video players, MP3 players, USB sticks, notebooks, and PDAs).

The invention is based on the concept of consistently identifying which mobile telephones have been connected to the device in the motor vehicle by storing corresponding data in the motor vehicle. A check may thus be easily made at a later time as to whether a non-functioning device or a device which does not function in the intended manner is even compatible with the particular device in the motor vehicle, and therefore should be expected to function properly. For this purpose, appropriate service-relevant data for connected devices must be stored in the vehicle for an existing connection.

The subsequent availability of the data is particularly advantageous, since error detection in a service department is often based on a verbal description of malfunctions that have occurred in the past.

According to the present invention, characteristic data for a mobile telephone connected to a device in the motor vehicle are stored in a memory unit provided in the motor vehicle. The data are therefore available for subsequent reading and/or comparison.

The subsequent error detection is simplified because of the availability of the characteristic data. Furthermore, the responsibility for any error detection and/or repair measures may be determined. Thus, it may be possible for the party responsible for intentional or negligent connection of an incompatible device to incur the costs for subsequent error detection and/or repair measures. Conversely, customers are able to demonstrate to the manufacturer and/or a service department that only compatible devices have been connected, thereby substantiating their warranty claim. In addition, costs may be divided between the service department and the manufacturer while taking into account knowledge about the characteristic data for connected devices.

The characteristic data may be information about the manufacturer, model, software version, and/or hardware version of the mobile telephone. On the basis of such data, it is possible to unambiguously determine whether the device is objectively compatible according to the manufacturer's instructions. Generally, such characteristic data may be retrieved from a mobile telephone using standard commands (for example, AT commands defined in GSM 07.07). Even non-standardized reply formats may be processed using suitable conversion algorithms.

According to one exemplary embodiment of the present invention, the device in the motor vehicle to which the mobile telephone is connected is a hands-free device. This hands-free device may be provided in the motor vehicle by the manufacturer. However, the invention is also applicable to the connection of mobile telephones to motor vehicle components for other applications known from the prior art. The device in the motor vehicle to which the mobile telephone is connected may include multiple subcomponents.

The mobile telephone may be connected to the device in the motor vehicle in a cordless manner (via Bluetooth, for example).

The memory unit, in which the characteristic data are stored, may be assigned to the device in the motor vehicle to which the mobile telephone is directly connected. The memory unit may be integrated into this unit (for example, the control device for the hands-free device) to facilitate a compact design, among other factors. However, the characteristic data may also be stored in a central memory unit in the motor vehicle. To this end, the device in the motor vehicle to which the mobile telephone is directly connected is able to directly or indirectly relay the characteristic data to the central memory unit.

An independent memory region for the characteristic data may also be reserved in the memory unit.

For interrogation of the characteristic data for the mobile telephone, the device in the motor vehicle to which the mobile telephone is directly connected may transmit an interrogation command to the mobile telephone (AT GSM command, for example). For a cordless connection, transmission of the interrogation command and subsequent transmission of the characteristic data are performed in a cordless manner.

The retrieval of the characteristic data from the mobile telephone by this device in the motor vehicle may also be initiated by a second device in the motor vehicle which communicates with the directly connected device. In this manner, indirect interrogation of the characteristic data is also possible. The characteristic data may then be interrogated, for example, by the directly connected device and relayed to the second device.

According to one exemplary embodiment of the present invention, the characteristic data are read from the memory unit by a diagnostic device which is temporarily connected to the motor vehicle. Depending on the embodiment of the invention, such a diagnostic device which is temporarily connected to the motor vehicle can directly or indirectly communicate with the memory unit or the associated device in the motor vehicle (for example, the control device for the hands-free device).

When the characteristic data are read from the memory unit, the mobile telephone typically is no longer connected to the device in the motor vehicle. Nevertheless, the manufacturer, model, and software version, for example, may be determined on the basis of the characteristic data.

After the reading, it may be advantageous to convert the characteristic data for the mobile telephone from a first data format to a second data format. The characteristic data may thus be edited, for example, with regard to their text readability. Characteristic data may initially be present in the form of hexadecimal code and may then be converted to a character sequence, such as the manufacturer's name. This conversion may occur in the device, (for example, the control device), in the motor vehicle associated with the memory unit in which the characteristic data are stored. For example, appropriate conversion rules may be stored in a control device description file for this control device. The data format may also be converted before or during the storage of the characteristic data for the mobile telephone in the memory unit. In that case, the characteristic data are already stored in the second data format.

According to one exemplary embodiment of the present invention, the compatibility of the mobile telephone with the device in the motor vehicle to which the mobile telephone has been connected is checked on the basis of the characteristic data for the mobile telephone. To this end, the characteristic data for the mobile telephone may be compared to characteristic data concerning the status (hardware and/or software) of the device in the motor vehicle. The result of this comparison is then a conclusion regarding compatibility. The test may be performed in the device in the motor vehicle which is connected to the mobile telephone, when this device contains the memory unit in which the characteristic data are stored or will be stored. A result of the compatibility test, possibly together with the underlying characteristic data, may then be sent to the temporarily connected diagnostic device. Alternatively, it is possible to initially transmit only the characteristic data to the diagnostic device, which then itself performs the compatibility test.

In both cases, the compatibility test may be carried out by comparing the characteristic data with a reference table in which compatible and, possibly, incompatible devices are listed and which—depending on where the compatibility test takes place—are to be correspondingly stored in the device in the motor vehicle or in the diagnostic device.

The result of the compatibility test may be displayed in both cases by a display unit connected to the diagnostic device. In this manner the personnel of a service department may easily and quickly determine which mobile telephones have been connected in the past and whether the connected mobile telephones are compatible with the motor vehicle or its devices. For incompatible devices, the error detection may thus be shortened or even terminated. The information provided to a customer in a user's manual, for example, may be used as a criterion for the compatibility.

According to one exemplary embodiment of the invention, the result of the compatibility test is relayed to a system for error analysis and/or customer consultation and/or invoice billing, and is taken into account by the system. Thus, a customer of a service department, for example, may be specifically told that he is using an incompatible device and thus may expect malfunctions, or that the customer himself is responsible for such malfunctions. By completely or partly generating billing invoices automatically in a service department, consideration may even be given to whether any error detection or repair measures to be billed are attributable to the use of an incompatible device, once again based on the result of the compatibility test. If necessary, information concerning errors stored in the vehicle and read by a diagnostic device, information concerning errors discovered or actions performed by service personnel, and/or information concerning part numbers present in the vehicle may be compared to an error database.

According to an exemplary embodiment of the present invention, a result of the compatibility test may be displayed to a user of the motor vehicle, such as by a display unit in the motor vehicle. The motor vehicle user is then directly informed of the compatibility of the accessory device which he has connected. In many cases, a complaint or claim possibly concerning functional limitations may thus be prevented at a dealership or repair shop.

This procedure is also applicable in principle without storing the characteristic data according to the invention for the mobile telephone in the vehicle. In such a case, the characteristic data would thus be transmitted from the mobile telephone to the motor vehicle or to a device therein, but would be immediately processed at that location, not stored. In this regard the invention further relates to a method for displaying the compatibility of an accessory device connected to a device in a motor vehicle, such as a mobile telephone, in which characteristic data for the accessory device are transmitted to the device in the motor vehicle, a compatibility test is performed based on the characteristic data, and the result of the compatibility test is displayed in the motor vehicle.

The reading of the characteristic data for connected mobile telephones may also be used for statistical purposes by the manufacturer. For example, for a database of appropriate size, conclusions may be drawn concerning the popularity of individual manufacturers and models. Depending on legal requirements, it may be necessary to obtain consent by the customer. The information obtained may be valuable for marketing purposes, for example. Furthermore, development of specialized technical performance features for the support of popular models or discontinuation of support for seldom-used models may be considered.

As a representative of the large variety of accessory devices that can be connected to devices in a motor vehicle, for the most part only mobile telephones are expressly mentioned in the present description of the invention. However, the invention may be easily applied to other types of accessory devices, in particular other telecommunication devices (smart phones, for example) as well as media players (MP3 players, for example), memory devices (USB sticks, for example), portable computers (notebooks or PDAs, for example), and the like. Therefore, the invention also encompasses the use of such devices, as well as the mobile telephone explicitly referenced in the present description.

Other objects, advantages and novel features of the present invention will become apparent from the following detailed description of the invention when considered in conjunction with the accompanying drawings.

BRIEF DESCRIPTION OF THE DRAWINGS

An exemplary embodiment of the invention is described in greater detail below with reference to the accompanying drawings, which show the following.

DETAILED DESCRIPTION OF THE DRAWINGS

Figure 1:
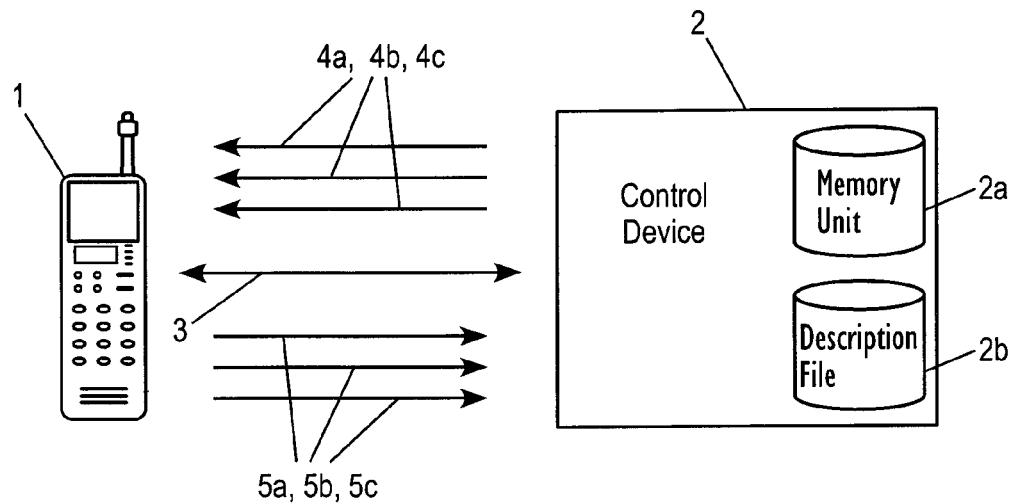
FIG. 1 shows a signal flow diagram for the storage of characteristic data according to the invention for a mobile telephone in a memory unit of a hands-free device in a motor vehicle.

FIG. 1 shows a signal flow diagram for an exemplary embodiment of the storage of characteristic data according to the invention for a mobile telephone in a memory unit of a hands-free device in a motor vehicle. The mobile telephone 1 is connected via a Bluetooth interface to the control device 2 of a hands-free device in a motor vehicle. For this purpose the mobile telephone 1 has an integrated Bluetooth antenna, and the control device 2 is connected to an external Bluetooth antenna, similarly as for the other components of the hands-free device (not specifically illustrated graphically). The double arrow 3 illustrates the communication for telephony purposes.

As soon as a mobile telephone is connected for the first time, the control device 2 sends three AT GSM commands 4a, 4b, 4c to the particular mobile telephone, in this case mobile telephone 1. The manufacturer identification code, model identification code, and the software version of the mobile telephone 1 are interrogated by the AT GSM commands. The mobile telephone 1 sends as the reply the manufacturer identification code 5a, model identification code 5b, and code 5c for the software version, in each case in the form of hexadecimal code.

The control device 2 converts the received hexadecimal codes according to a conversion algorithm stored in the control device, in each case in a character chain (one chain each for manufacturer name, model name, and software version), and stores this information in the memory unit 2a. To this end, the conversion algorithm compares the received hexadecimal code completely or partially to comparison codes kept ready for comparison purposes. If agreement is determined between a read hexadecimal code and one of the comparison codes provided, a character chain is stored which is associated with the particular comparison code. On the other hand, if no matching comparison code is found, the hexadecimal code is stored without further conversion. Thus, at least for known telephone models, the conversion algorithm allows "readable" character chains to be stored as characteristic data.

Additional data (in this case, the date, time, and odometer reading of the motor vehicle, for example) are also stored together with the characteristic data for the mobile telephone.

The memory unit 2a is able to store the manufacturer name, model name, and software version in the described manner for up to four mobile telephones which have been connected to the hands-free device. If a greater number of different mobile telephones are connected, the older memory entries are overwritten.

The control device 2 also compares new characteristic data entries into the memory unit 2a, using a reference table stored in the control device description file 2b. The reference table contains all combinations of manufacturer names, model names, and software versions that have been defined as compatible. If a mobile telephone is considered to be compatible as the result of the comparison, a corresponding compatibility bit for the particular characteristic data set is placed in the memory unit 2a.

Figure 2:
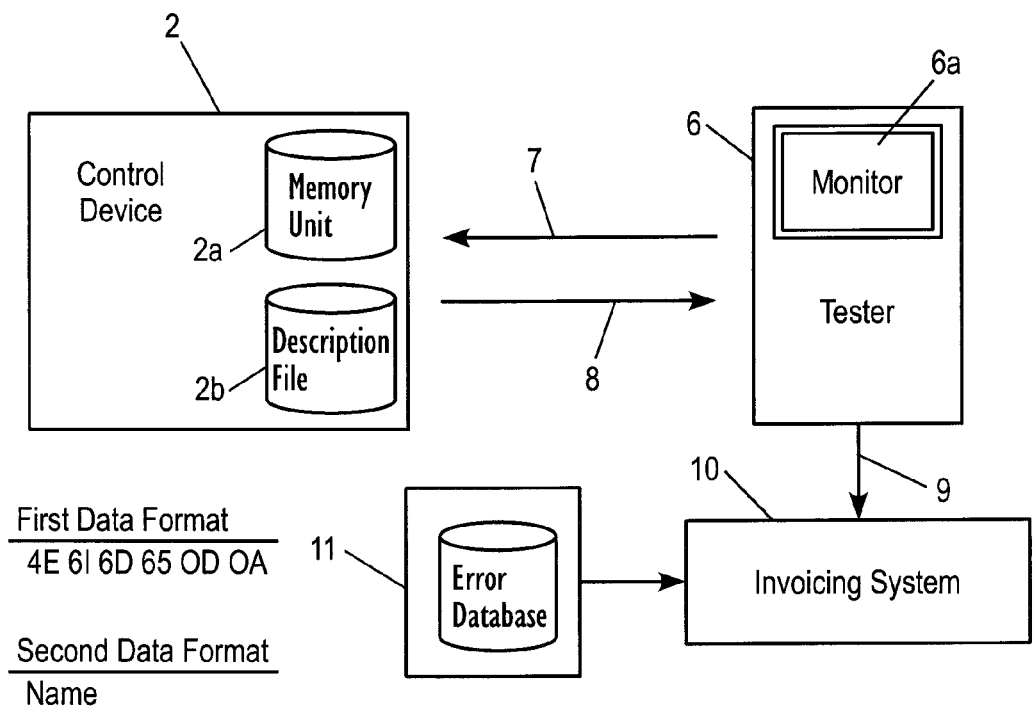
FIG. 2 shows a signal flow diagram for the reading of stored characteristic data from the same memory unit.

FIG. 2 shows a signal flow diagram for reading of the stored characteristic data from the memory unit 2a for the control device 2.

A diagnostic tester 6 is temporarily connected to the diagnostic socket for the motor vehicle, and after connection is able to communicate bilaterally with the control device 2.

The diagnostic tester 6 sends a diagnostic command 7 to the control device 2. The diagnostic command 7 concerns the characteristic data sets stored in the memory unit 2a. The characteristic data sets are then transmitted to the diagnostic tester as a signal 8.

The diagnostic tester 6 is suitable for generating a list of connected mobile telephones from the received characteristic data sets and outputting the list to its monitor 6a. Incompatible devices are identified separately.

The diagnostic tester 6 is also suitable for reporting, in the form of a signal 9, the presence of incompatible mobile telephones to a system 10 for automatically preparing billing invoices. The invoicing system 10 may thus take into account fault regarding any necessary error detection or repair measures. The system also uses data from an error database 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assisting in error detection for a motor vehicle, comprising the acts of:
    sending an interrogation command from a control device in the motor vehicle to an accessory device connected to the control device for reading characteristic data from the accessory device;
    storing, in a memory unit provided in the motor vehicle, the characteristic data read from the accessory device;
    determining a compatibility of the accessory device with the control device based on a comparison between a reference table and the characteristic data stored in the memory unit; and
    performing the error detection in an error analysis system when a result of the comparison is positive and disabling the error detection when the result of the comparison is negative.

2. The method according to claim 1, wherein the memory unit in which the characteristic data are stored is assigned to the device in the motor vehicle to which the accessory device is connected.

3. The method according to claim 1, wherein the control device in the motor vehicle to which the accessory device is connected is a hands-free device.

4. The method according to claim 1, wherein the accessory device is connected to the control device in the motor vehicle in a wireless manner.

5. The method according to claim 1, wherein, after being read, the characteristic data for the accessory device are converted from a first data format to a second data format.

6. The method according to claim 1, wherein the characteristic data and a result of the compatibility determination are read from the memory unit by a diagnostic device which is temporarily connected to the motor vehicle.

7. The method according to claim 1, wherein a result of the compatibility determination is relayed to the error analysis system for error analysis, customer consultation, and invoice billing, and is taken into account by the system.

8. The method according to claim 1, wherein a result of the compatibility determination is displayed in the motor vehicle.

9. The method according to claim 2, wherein the control device in the motor vehicle to which the accessory device is connected is a hands-free device.

10. The method according to claim 2, wherein the accessory device is connected to the control device in the motor vehicle in a wireless manner.

11. The method according to claim 2, wherein, after being read, the characteristic data for the accessory device are converted from a first data format to a second data format.

12. The method according to claim 2, wherein the compatibility of the accessory device with the control device in the motor vehicle is checked on the basis of the characteristic data.

13. The method according to claim 2, wherein the characteristic data and a result of the compatibility determination are read from the memory unit by a diagnostic device which is temporarily connected to the motor vehicle.

14. The method according to claim 7, wherein a result of the compatibility determination is displayed in the motor vehicle.

15. An apparatus for assisting in error detection for a motor vehicle, comprising:
    a control device configured to detect a first connection to an accessory device, transmit an interrogation command to the accessory device based on detection of the first connection, receive characteristic data from the accessory device, store the characteristic data in a memory unit of the control device, determine a compatibility of the accessory device with the control device based on a comparison between a reference table and the characteristic data stored in the memory unit, output a result of the comparison to an error analysis system that performs the error detection when the result of the comparison is positive, and disable the error detection when the result of the comparison is negative.

16. The apparatus of claim 15, wherein the accessory device is a hands-free device.

17. The apparatus of claim 15, wherein the accessory device is wirelessly connected to the control device.

18. The method according to claim 1, further comprising the act of:
    displaying the compatibility determination in the motor vehicle.

19. The method according to claim 1, wherein the characteristic data comprises a manufacturer identifier and a model identifier of the accessory device and at least one of a software version and a hardware version of the accessory device.

20. The apparatus of claim 15, wherein the characteristic data comprises a manufacturer identifier and a model identifier of the accessory device and at least one of a software version and a hardware version of the accessory device.

* * * * *